Patented May 3, 1927.

1,627,069

UNITED STATES PATENT OFFICE.

VERNON M. WADE, ARTHUR C. ZIMMERMAN, AND SAM D. HERON, OF DAYTON, OHIO.

LIQUID COATING COMPOSITION.

No Drawing. Application filed October 19, 1923. Serial No. 669,532.

This invention relates to a liquid coating composition which is especially adaptable for use under high temperature conditions, such as would be encountered on air-cooled cylinders of aeronautical or automobile engines.

The principal object of the invention is to provide a liquid coating composition or enamel having improved characteristics enabling it to be applied in a liquid form to the surface intended to be coated on which it may be baked. After baking, this enamel is particularly adaptable for use under high temperature conditions and, also for use where high resistance of hot oils and fuels is essential.

A further object is to provide an enamel of the characteristic above set forth which will be composed essentially of a bitumen such as gilsonite and a vegetable oil such as castor-oil.

Still other objects and advantages of this invention will be more fully set forth in the following detailed description.

Experiments have shown that the ordinary enamels do not withstand high temperatures well, but we have found that an enamel may be obtained which is capable of withstanding high temperatures without peeling or cracking, by the proper mixture of a bitumen and castor-oil. As a bitumen we use natural gilsonite, or what is commercially known as mineral rubber, both of these materials being solid at ordinary room temperatures and both being nearly pure bitumen; the first being a natural mined product and the second an artificially made product often containing gilsonite as one of its constituents.

As a vegetable oil, we use castor-oil or a mixture of castor-oil and linseed oil. We have found that a better product may be obtained by using treated castor-oil rather than untreated castor-oil; the treatment consisting of blowing the castor-oil with air for about four hours at a temperature in the neighborhood of 550° F. and then allowing to cool.

Five examples of my improved enamel are given as follows:

*Formula No. 1.*

4 oz. gilsonite.
3 oz. castor-oil.
2 oz. linseed oil.
Thinner.

*Formula No. 2.*

4 oz. gilsonite.
4 oz. castor-oil.
1 oz. linseed oil.
Thinner.

*Formula No. 3.*

3 oz. gilsonite.
3 oz. castor-oil.
2 oz. linseed oil.

*Formula No. 4.*

2 oz. gilsonite.
2 oz. mineral rubber.
4 oz. castor-oil.
1 oz. linseed oil.
Thinner.

*Formula No. 5.*

4 oz. gilsonite.
5 oz. treated castor-oil.
Thinner.

In formulæ 1, 2, and 3, the preparation may vary. However, good products are obtained if the gilsonite is melted and added to linseed oil which has previously been heated to 550° F., held at this temperature for a short time and then allowed to cool to 500° F. After the melted gilsonite is added to the linseed oil, the castor-oil which has been heated to 500° F. is then added to the mixture. The temperature of the whole is then raised to 550° F. and held there for approximately fifteen minutes. The mixture is then permitted to partially cool at which time the turpentine, benzol or other thinner is added. Unless the thinner is added before complete cooling, the oil and gilsonite mixture will probably solidify.

In formulæ Nos. 4 and 5, the bitumen is added to the treated castor-oil or castor and linseed oil and heated to approximately 600° F. and held at that temperature for approximately fifteen minutes. This mixture is then thinned, preferably with turpentine, before complete cooling, until the desired consistency is obtained.

It will be noted that in formulæ Nos. 1, 2, 4 and 5 the amount of bitumen present, whether the bitumen consists of gilsonite or a mixture of gilsonite and mineral rubber, is 4 oz., while in these formulæ the amount of vegetable oil present, whether castor-oil or a mixture of castor-oil and linseed oil, is 5 oz. It will, therefore, be seen that it is necessary to have the weight of the vegetable oil content of the enamel slightly in excess of the weight of the bitumen content.

The enamel as just described, after being baked upon the surface of an air-cooled engine, for example, forms a hard weather-proof and fuel-proof coating which will not be disturbed or caused to peel at the ordinary working temperatures of the engine. It is, of course, evident that our improved enamel is capable of a great number of other uses where it is desired to provide a weather-proof protective coating upon any surface.

We claim:

1. A liquid coating composition especially adapted for use on hot metallic surfaces after being baked; comprising a mixture of gilsonite, castor-oil, linseed oil and turpentine, the weight of the gilsonite content being substantially from 80% to 133% of the weight of the castor oil content of the composition and from 60% to 80% of the combined castor oil and linseed oil content.

2. An enamel adapted to be baked on a surface for use under high temperature conditions, comprising a mixture of a bitumen which is solid at ordinary room temperatures and including gilsonite, a vegetable oil; the weight of the bitumen content being substantially from 60% to 80% of the weight of the oil, and a thinner.

3. An enamel comprising a mixture bitumen including gilsonite, a thinner, and castor-oil which has been blown with air at a high temperature, the amount of bitumen present being substantially from 60% to 80% by weight of the amount of castor-oil.

In testimony whereof we affix our signatures.

VERNON M. WADE.
ARTHUR C. ZIMMERMAN.
SAM D. HERON.